(12) United States Patent
Wang et al.

(10) Patent No.: US 10,412,031 B2
(45) Date of Patent: Sep. 10, 2019

(54) INFORMATION FILTERING METHOD AND APPARATUS, TERMINAL, AND STORAGE MEDIUM

(71) Applicant: Beijing Xiaomi Mobile Software Co., Ltd., Beijing (CN)

(72) Inventors: Yongshan Wang, Beijing (CN); Donghai Huo, Beijing (CN); Xiaotong Liu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 190 days.

(21) Appl. No.: 15/491,021

(22) Filed: Apr. 19, 2017

(65) Prior Publication Data

US 2017/0310621 A1    Oct. 26, 2017

(30) Foreign Application Priority Data

Apr. 20, 2016    (CN) .......................... 2016 1 0249092

(51) Int. Cl.
*H04L 12/58* (2006.01)
*G06F 16/9535* (2019.01)

(52) U.S. Cl.
CPC .......... *H04L 51/12* (2013.01); *G06F 16/9535* (2019.01); *H04L 51/04* (2013.01)

(58) Field of Classification Search
CPC .... H04L 51/12; H04L 51/04; G06F 17/30867
USPC ....................................................... 709/206
See application file for complete search history.

(56) References Cited

U.S. PATENT DOCUMENTS

| 2004/0154022 | A1* | 8/2004 | Boss .................... G06Q 10/107 719/310 |
| 2005/0254443 | A1* | 11/2005 | Campbell .............. H04B 17/23 370/310 |
| 2009/0164577 | A1* | 6/2009 | Parkes ............... G06Q 30/0204 709/204 |
| 2011/0307783 | A1* | 12/2011 | Robert .................. H04N 5/445 715/716 |
| 2016/0323364 | A1 | 11/2016 | Xu et al. |

FOREIGN PATENT DOCUMENTS

| CN | 101257671 A | 9/2008 |
| CN | 102750341 A | 10/2012 |
| CN | 103336761 A | 10/2013 |
| CN | 104809209 A | 7/2015 |
| CN | 105099877 A | 11/2015 |
| WO | WO 2010/068470 A1 | 6/2010 |

OTHER PUBLICATIONS

International Search Report in International Application No. PCT/CN2016/097010, dated Jan. 11, 2017.
Extended Search Report for European Application No. 17167187.8 from the European Patent Office, dated Aug. 4, 2017.

* cited by examiner

*Primary Examiner* — Zi Ye
(74) *Attorney, Agent, or Firm* — Finnegan, Henderson, Farabow, Garrett & Dunner LLP

(57) ABSTRACT

An information filtering method for use in a terminal, includes: calculating, based on application information received by the terminal, an information display characteristic of the application information, the information display characteristic representing a display feature of the application information; determining the application information as interfering information, if the information display characteristic meets an interference characteristic condition; and filtering out the application information.

14 Claims, 6 Drawing Sheets

INFORMATION FILTERING METHOD AND APPARATUS, TERMINAL, AND STORAGE MEDIUM

CROSS-REFERENCE TO RELATED APPLICATIONS

This application is based on and claims priority of Chinese Patent Application No. 201610249092.6, filed on Apr. 20, 2016, which is incorporated herein by reference in its entirety.

TECHNICAL FIELD

The present disclosure is generally related to the field of network technology, and more particularly, to an information filtering method and apparatus, a terminal, and a storage medium.

BACKGROUND

Smart terminals have gradually become widely used. For example, people may use smart handsets to surf Internet, perform social communications and go shopping. The use of smart terminals has made people's life more convenient. When a user acquires information using a smart terminal, the user usually has a certain purpose and only intends to acquire target information, but may not be interested in non-target information. However, sometimes non-target information is automatically sent to the user's smart terminal. The user can only passively receive such interfering information and filter out the same manually, such as manually deleting the interfering information, manually skipping this information or the like, which decreases efficiency of acquiring target information.

SUMMARY

According to a first aspect of the present disclosure, there is provided an information filtering method for use in a terminal, comprising: calculating, based on application information received by the terminal, an information display characteristic of the application information, the information display characteristic representing a display feature of the application information; determining the application information as interfering information, if the information display characteristic meets an interference characteristic condition; and filtering out the application information.

According to a second aspect of the present disclosure, there is provided a terminal, comprising: a processor; and a memory configured to store instructions executable by the processor. The processor is configured to: calculate, based on application information received by the terminal, an information display characteristic of the application information, the information display characteristic representing a display feature of the application information; determine the application information as interfering information, if the information display characteristic meets an interference characteristic condition; and filter out the application information.

According to a third aspect of the present disclosure, there is provided a non-transitory computer-readable storage medium having stored therein instructions that, when executed by a processor of a terminal, cause the terminal to perform an information filtering method comprising: calculating, based on application information received by the terminal, an information display characteristic of the application information, the information display characteristic representing a display feature of the application information; determining the application information as interfering information, if the information display characteristic meets an interference characteristic condition; and filtering out the application information.

It should be understood that both the foregoing general description and the following detailed description are only exemplary and explanatory and are not restrictive of the disclosure.

BRIEF DESCRIPTION OF THE DRAWINGS

The accompanying drawings, which are incorporated into and constitute a part of the description, illustrate embodiments according to the present disclosure, and serve to explain the principles of the present disclosure together with the description.

DETAILED DESCRIPTION

Figure 1:
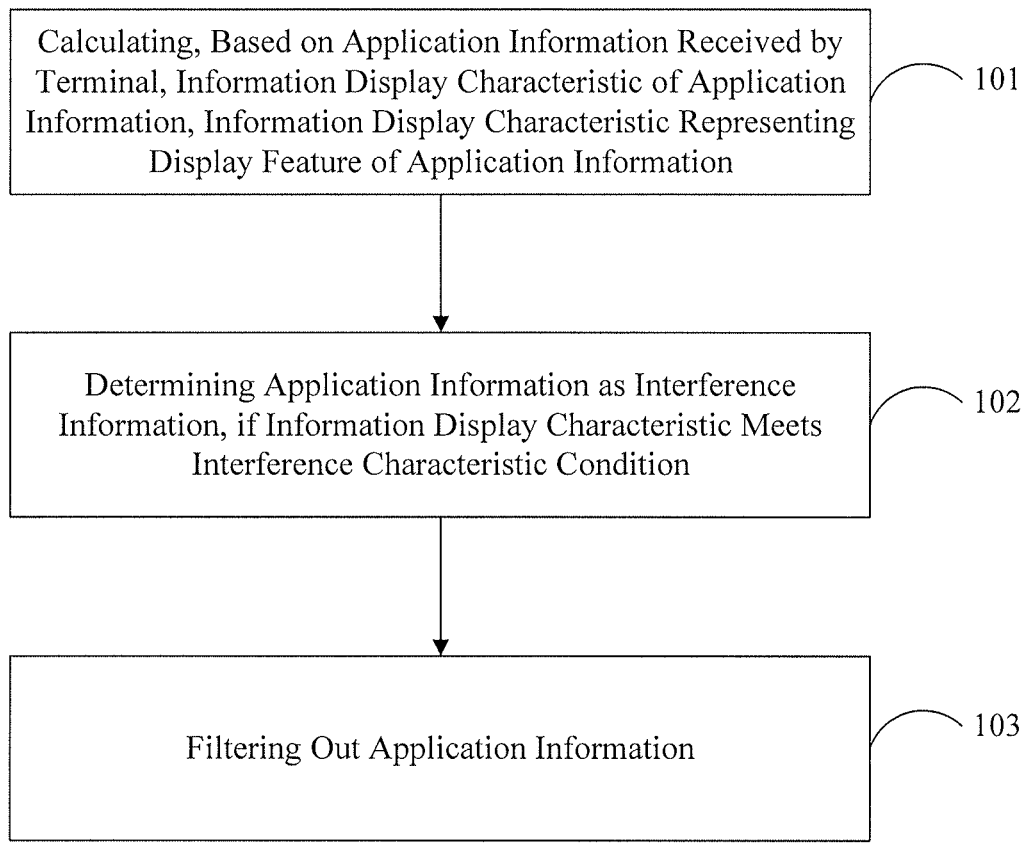
FIG. 1 is a flow chart of an information filtering method according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the disclosure. Instead, they are merely examples of devices and methods consistent with aspects related to the disclosure as recited in the appended claims.

Embodiments of the present disclosure provide an information filtering method. The information filtering method may be applied when a user acquires target information using a smart terminal, to automatically and quickly filter out interfering information affecting the user's efficiency of acquiring the target information and, hence, improve a speed of acquiring the target information.

For example, the information filtering method may be applied in the following scene. Taking an example where the smart terminal is a handset, the user may chat with other users using instant communication software and may receive application information sent by the other users in a chatting process. Among the received application information, the user may aim to obtain only certain specific application information, which may be referred to as target information of interest to the user, but may not care about other information. However, the user may still have to passively receive and view other information. By using the information filtering method in the present disclosure, the instant communication software can quickly filter out non-target interfering information.

The specific application information which the user wants to obtain may be, for example, a red envelope in instant communication software that allows another user to send money in a chat group through electronic payment, such that any user in the chat group can obtain the money. For example, when grabbing a red envelope, the user tends to focus only on the red envelope so as to grab the red envelope as fast as possible. Information other than the red envelope may be taken as interfering information, which the user wants to filter out so as to avoid interfering with grabbing the red envelope. In the following, the information filtering method will be described by taking, as an example, a scene where multiple users chat and grab red envelopes using the instant communication application. However, it can be understood that the information filtering method is not so limited and may be used in other similar scenes in which information needs to be filtered.

In the example of grabbing a red envelope using the instant communication application, in order to grab the red envelope quickly, the user often continuously clicks a chat interface of the user's smart terminal when the red envelope is about to be received (e.g., the user knows in advance that someone is to give the red envelope), so as to shorten intrinsic delay of human beings in reacting to arrival of the red envelope. In this case, such situations as follows are likely to occur which interfere with the user's grabbing the red envelope.

For example, on the chat interface there is suddenly displayed a wide image sent by another user, and the user clicks this image by accident in the process of continuously clicking the chat interface so that this image is displayed in full screen. As a result, the timing to grab a red envelope may be missed or delayed, if the red envelope arrives at this moment.

In another example, on the chat interface there is displayed a long image sent by another user, and the user has to manually drag the screen at its bottom upwards to skip this image. This also affects timely clicking of the red envelope.

In yet another example, on the chat interface there are displayed chat text or images (even if these images are relatively small) repeatedly sent by another user. The repeatedly sent information also occupies screen space, and needs to be manually removed by the user so as to see the arrived red envelope as soon as possible.

In order to quickly filter out interfering information, such as the exemplary information noted above interfering with the grabbing of the red envelope, the present disclosure provides an information filtering method.

FIG. 1 is a flow chart of an information filtering method 100 according to an exemplary embodiment. For example, the method 100 may be used in a terminal such as a smart terminal. Referring to FIG. 1, the method 100 includes the following steps.

In step 101, based on application information received by the smart terminal, an information display characteristic of the application information is calculated, the information display characteristic representing a display feature of the application information.

In the exemplary embodiment, the application information may be information received or sent in an application. For example, for an instant communication application, a message sent in a multi-user chat group is considered to be application information. When an instant communication client in a smart terminal receives application information sent by a user in the multi-user chat group, step 101 may be executed to calculate the information display characteristic of the application information prior to displaying the application information on a chat interface.

The information display characteristic referred to herein may include, for example, which positional area on the chat interface (or a screen) of the smart terminal the information is displayed in. Display coordinates indicating a display position may be used to represent a positional area. For the instant communication client, display coordinates of application information may be obtained. In another example, the information display characteristic may further include a digest of the application information. As different application information has different digests, a digest may be used to determine whether its corresponding information is repeated information which has been displayed previously. Thus, whether the application information is repeatedly received may also be considered as a display feature of the information.

The information display characteristic may also be any other characteristic. By calculating the information display characteristic, the instant communication client may determine, according to the information display characteristic, whether the application information will affect the user's efficiency of acquiring target information and/or whether the application information will be interfering information which the user does not want to see, if the application information is normally displayed on the screen interface; and based thereon further determine how to display the application information on the screen interface.

In step 102, the application information is determined as interfering information, if the information display characteristic meets an interference characteristic condition.

For example, the interference characteristic condition can be determined in advance, prior to determining how to display the application information according to the information display characteristic of the application information in step 101. The interference characteristic condition may serve as a basis for judging whether the application information received by the smart terminal is information interfering with target information. Still taking the red envelope as an example, assuming that the user continuously clicks the screen in order to acquire the red envelope as fast as possible, then the red envelope is the target information which the user wants to obtain, while other information may be considered as the interfering information hindering the user from acquiring the red envelope, such as the exemplary information noted above which interferes with the user grabbing the red envelope. For example, when the user clicks an image received as application information by accident in the process of continuously clicking the chat interface, the image is displayed in full screen, thereby affecting the acquisition of the red envelope. Therefore, if it is determined according to the interference characteristic condition that the display of the application information impedes the target information, the instant communication client adjusts the manner for displaying the image.

The interference characteristic condition may be determined in various manners according to a feature of target information to be acquired by the user. For instance, in the example of grabbing the red envelope, as the user's habit of clicking the screen, the user tends to continuously click the vicinity of a central position on the chat interface so as to click the red envelope. Then, if the image is too wide and extends beyond the central position on the chat interface, it is likely for the user to click this image by accident. In this case, the central position on the chat interface may be taken as a limit, and that an edge of the image reaches or extends beyond the central position is taken as an interference characteristic condition. That is, if the edge of the image reaches or extends beyond the central position, it means that the interference characteristic condition is met. This is just one example, and the interference characteristic condition is not limited thereto in specific implementations. The interference characteristic condition may be determined according to the manner for the user to acquire the target information, the feature of the target information, etc.

In step 103, the application information is filtered out.

For example, filtering out the application information may include diminishing a wide image received as the application information, so as to make it narrow, or replacing the image with a mark instead of displaying the image directly. For example, a mark is displayed at a position where the application information should have been displayed, and the user may know from the mark that the application information has arrived. The instant communication client may adopt various manners to adjust the display of the application information that meets the interference characteristic condition to reduce the influence of the application information on the target information.

It should be noted that the information filtering method 100 may also provide the user with an option of whether to start the method. For example, still taking the instant communication client as an example, when multiple users are chatting together, a user may not want interfering information to be filtered out even if the user participates in grabbing the red envelope. Therefore, the instant communication client may provide a human-machine interaction interface option, such that the user may select whether to start an information filtering function implemented based on the method 100. When the user selects to use the information filtering function, the user may also be allowed to select which kind of information the target information is, so as to improve the accuracy of filtering out the interfering information to various target information.

With the information filtering method 100, application information is filtered by calculating the information display characteristic of the application information to be displayed and determining whether the application information is interfering information according to the information display characteristic, thereby enabling the interfering information to be filtered out automatically and quickly and hence improving the efficiency of acquiring the target information.

In the example of grabbing the red envelope in the instant communication application, the target information may be the red envelope, and the interfering information may be determined to be three kinds of information, including a wide image, a long image, and repeated information (repeated text or repeated images, for example). In specific implementations, the interfering information may include other types of information.

In this example, the interference characteristic condition of the interfering information may be determined to be, for example, if application information is displayed, display coordinates of the application information falling within an interference coordinate range. For example, the interference coordinate range may be set to being greater than or equal to c1 in terms of a length of an image, in order to limit a long image; and/or being greater than or equal to k1 in terms of a width of an image, in order to limit a wide image. Also for example, the interference coordinate range may be set to, if an image is displayed beginning from the left edge of the screen (supposing an icon corresponding to a sender of application information is presented at the left end of the chat interface), the right edge of the image having a coordinate greater than or equal to x1 in the X axis when the origin of the X axis is at the left end. Further for example, the interference coordinate range may be set to, if the image is displayed from the right edge of the screen (supposing the icon of the sender of application information is presented at the right end of the chat interface), the left edge of the image having a coordinate greater than or equal to x2 in the X axis when the origin of the x coordinate is in the right end. In addition, the digest of the application information may be calculated, and the digest being repeated may be taken as the interference characteristic condition.

Figure 2:
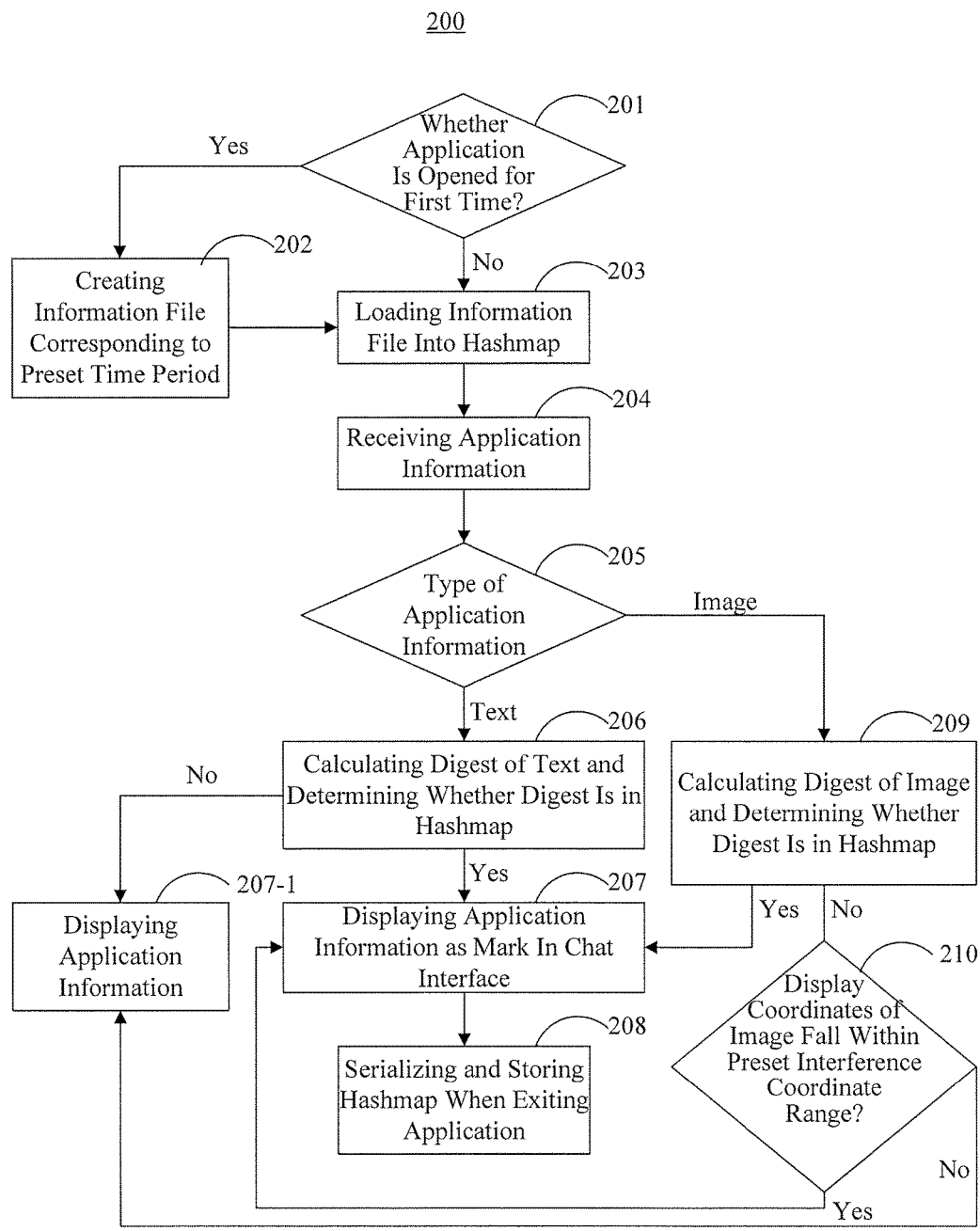
FIG. 2 is a flow chart of another information filtering method according to an exemplary embodiment.

FIG. 2 is a flow chart of an information filtering method 200 according to an exemplary embodiment. For example, the method 200 may be used in a terminal such as a smart terminal. Referring to FIG. 2, the method 200 includes the following steps.

In step 201, it is determined whether an application is opened on the smart terminal for a first time.

For example, when an instant communication client on the smart terminal is started by the user, the instant communication application judges whether this start is the first start within a preset time period. The purpose for setting the preset time period is mainly for reducing storage space for storing, in a subsequent step, information on the basis of which it is judged whether there is repeated information. For example, the preset time period is set to one day, such as from 0:00 to 24:00. Accordingly, the instant communication client may judge whether the application is opened for the first time today. If yes, step 202 is executed; otherwise, step 203 is executed.

In step 202, an information file corresponding to a preset time period is created.

For example, the instant communication client creates an information file corresponding to today in this step, when determining that the instant communication client is started for the first time today. In addition, an information file of yesterday may be deleted for reducing occupied storage space.

The information file is for storing a digest of each piece of application information received within the preset time period. For example, when the instant communication client is started for the first time today, the information file corresponding to today is created. Then, the digest of each piece of application information subsequently received today by the instant communication client is stored in the information file, for subsequently judging according to the stored digests whether newly received application information is repeated application information. For example, the information file may be named as filehashdb.20160307, which includes a date to facilitate distinguishing and deleting information files outside the preset time period. After creating the information file, the process proceeds to step 203.

In step 203, the information file is loaded into a hashmap for subsequent quick search.

For example, if the instant communication client is not started for the first time, it indicates that an information file corresponding to today has been stored locally, and this file may have been loaded into a hashmap. The hashmap is conducive to searching for a repeated digest subsequently, thereby improving search efficiency.

On the other hand, if the instant communication client is started for the first time, after the information file corresponding to today is created in the step 202, the information file may then be loaded into the hashmap in step 203. Then, digests of subsequently received application information may be stored and searched by using the hashmap.

In step 204, application information is received.

For example, the received application information may be such kinds of information as text or image sent by a user in a multi-person chat group.

In step 205, it is judged whether a type of the application information is image or text. If it is text, step 206 is executed. If it is image, step 209 is executed.

In step 206, a digest of the text is calculated and it is determined whether the digest is in the hashmap.

For example, the digest may be calculated using an algorithm, such as md5, and it is determined whether the digest is stored in the today's information file. The digest calculated herein may be used as an information display characteristic of the application information received in step 204.

If a digest identical to the calculated digest is stored in today's hashmap, it means that the information display characteristic meets the interference characteristic condition. That is, the application information is repeated information, and the same application information has been received previously. Then, step 207 is executed. Otherwise, if there is no identical digest in the hashmap (i.e., it is not in today's information file), it means that this application information is received for the first time today. Then, step 207-1 is executed.

In step 207, the application information is displayed as a mark in a chat interface.

Figure 3:
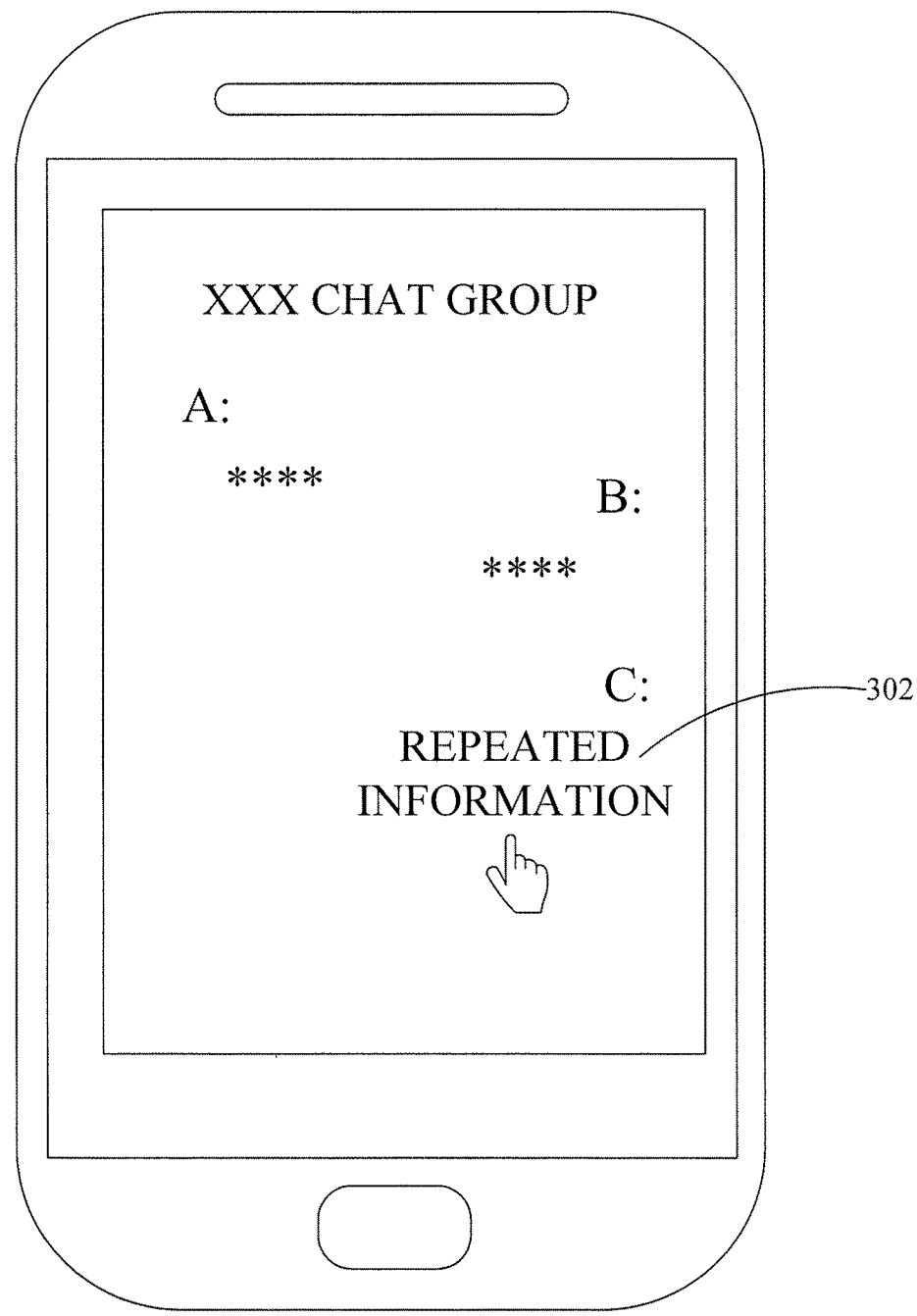
FIG. 3 is a schematic diagram of a chat interface displaying a mark according to an exemplary embodiment.

For example, a mark may be correspondingly displayed at a display position of the application information. The mark indicates that the application information has been received. The form of the mark is not limited. For example, FIG. 3 is a schematic diagram of a chat interface 300 displaying a mark 302 according to an exemplary embodiment. As shown in FIG. 3, in the exemplary embodiment, the mark 302 is the text "repeated information" to prompt a user.

If the user still wants to normally display the application information, the user may click to select the mark. Accordingly, the instant communication client receives a display instruction from the user with respect to the mark, and displays the application information at a display position where the application information should have been displayed. Then, the process turns to step 208.

In step 207-1, the application information is displayed, and then step 208 is executed.

In step 208, when the application is exited, the hashmap is serialized and stored for next use.

For example, when the instant communication application is exited, the hashmap is stored locally in the smart terminal in a serialized manner, such that when the instant communication application is started next time digests can be stored and searched for using the hashmap. The serialized manner refers to a process of converting a variable in the memory into a storable or transmittable form.

In step 209, a digest of the image is calculated and it is determined whether the digest is in the hashmap.

Step 209 is similar to step 206, and will not be repeated. If the digest of the image is in the information file, step 207 is executed; otherwise, the process proceeds to step 210.

In step 210, it is judged whether display coordinates of the image fall within a preset interference coordinate range.

For example, the calculated information display characteristic of the image is the display coordinates of the image and may include a display length of the image and a display width of the image. Also for example, the right edge of the image when displayed on the chat interface may be calculated as the display width of the image.

If the display length of the image exceeds a preset length c1 or a coordinate of the right edge of the image exceeds a preset coordinate x1, it means that the user needs to manually drag the image upwards till its bottom appears or leftwards till its right edge appears, if the image is displayed normally. If the image is opened due to being clicked by accident, the image displayed constitutes interfering information. Then, step 207 is executed. Otherwise, if both the length and the width of the image fall within the interference coordinate range, it means that the display of the image may not affect the acquisition of the target information. Then, step 207-1 is executed.

Furthermore, the interference coordinate range may be determined based on experience, or may be obtained through statistical processing based on historically recorded data on ranges in which target information is acquired. For example, the instant communication client may record an average coordinate value of a preset number of positions, at a respective one of which the user clicks the screen each time in a process of continuously clicking the screen to grab the red envelope. For example, coordinate values of nearly 10 positions, at a respective one of which the user clicks the screen each time, may be recorded and averaged to obtain an x coordinate which is taken as a basis for determining the preset coordinate x1 for the right edge of the image. In this manner, the interference coordinate range can be determined according to the usage habits of the user, and it can be determined more accurately whether the application information hinders the user from acquiring the target information.

In one exemplary embodiment, judging whether the image displayed constitutes interfering information includes judging whether the image is repeated information; and then judging whether display coordinates of the image (such as the length and the width of the image) fall within the interference coordinate range, when the image is determined not to be repeated information. A sequence of judgments made for the image is not limited in the present disclosure. For example, judging whether the display coordinates of the image (such as the length and the width of the image) fall within the interference coordinate range may be first performed. If yes, a mark is displayed directly; otherwise, it is then judged whether the image is repeated.

In the method 200, for determining the interfering information that affects grabbing the red envelope, it is judged comprehensively whether the application information including text and images is repeated and whether the display coordinates fall within the interference coordinate range. There may be other implementations. For example, it is judged only for application information of the text type whether the application information is repeated; or it is judged only for application information of the image type whether the application information is subject to interference identification. These implementations may be used separately or in combination flexibly.

In the information filtering method 200, by calculating the information display characteristic for the application information to be displayed, repeated information and wide or long images may be determined. As such, the wide or long images or the repeated information may be filtered out effectively and quickly, thereby reducing the interference to the user's acquiring the target information and improving the efficiency of acquiring the target information.

Figure 4:
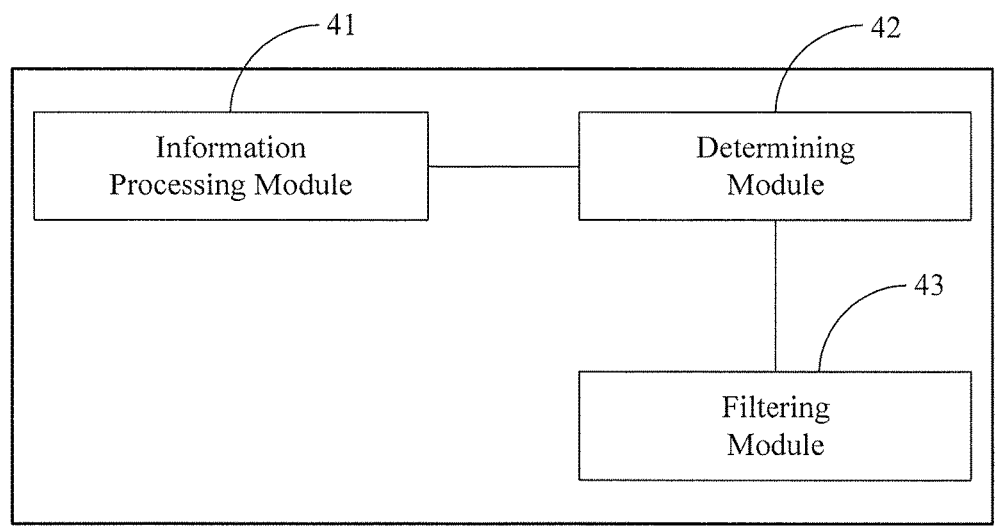
FIG. 4 is a block diagram of an information filtering apparatus according to an exemplary embodiment.

FIG. 4 is a block diagram of an information filtering apparatus 400 according to an exemplary embodiment. As shown in FIG. 4, the apparatus 400 includes an information processing module 41, a determining module 42, and a filtering module 43.

The information processing module 41 is configured to calculate, based on application information received by the apparatus 400, an information display characteristic of the application information, the information display characteristic representing a display feature of the application information.

The determining module 42 is configured to determine the application information as interfering information, if the information display characteristic meets an interference characteristic condition.

The filtering module 43 is configured to filter out the application information.

In one exemplary embodiment, the information display characteristic is a digest of the application information. The filtering determining module 42 is configured to compare the digest of the application information with stored digests and to determine the application information as interfering information if a digest identical to the digest of the application information exists in the stored digests.

In one exemplary embodiment, the information display characteristic is display coordinates of the application information when the application information is displayed. The filtering determining module 42 is configured to determine the application information as interfering information if the display coordinates fall within a preset interference coordinate range.

In one exemplary embodiment, the filtering module 43 is configured to display a mark at a display position of the application information, the mark indicating that the application information is received. The filtering module 43 is further configured to display the application information at the display position if a display instruction from a user with respect to the mark is received.

For example, the apparatus receives the application information in an instant communication application.

Figure 5:
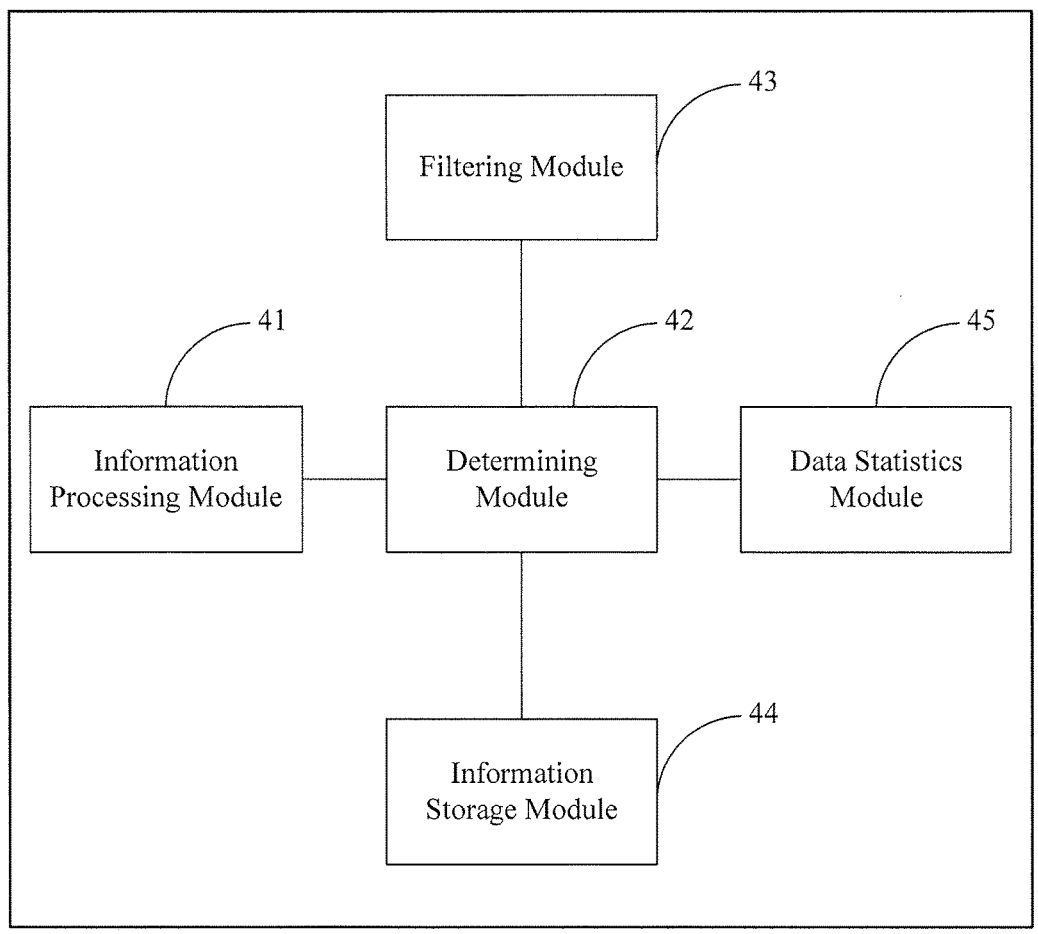
FIG. 5 is a block diagram of an information filtering apparatus according to an exemplary embodiment.

FIG. 5 is a block diagram of an information filtering apparatus 500 according to an exemplary embodiment. Referring to FIG. 5, the apparatus 500 further includes an information storing module 44 and a data statistics module 45, in addition to the information processing module 41, the determining module 42, and the filtering module 43 (FIG. 5).

The information storing module 44 is configured to store an information file corresponding to a preset time period, the information file storing a digest of each piece of application information received in the preset time period. The filtering determining module 42 is further configured to determine the application information as interfering information if the information file has stored a digest identical to the digest of the application information.

The data statistics module 45 is configured to acquire historically recorded data on coordinate ranges in which target information is acquired and to obtain the interference coordinate range through statistical processing based on the data of the coordinate ranges.

Figure 6:
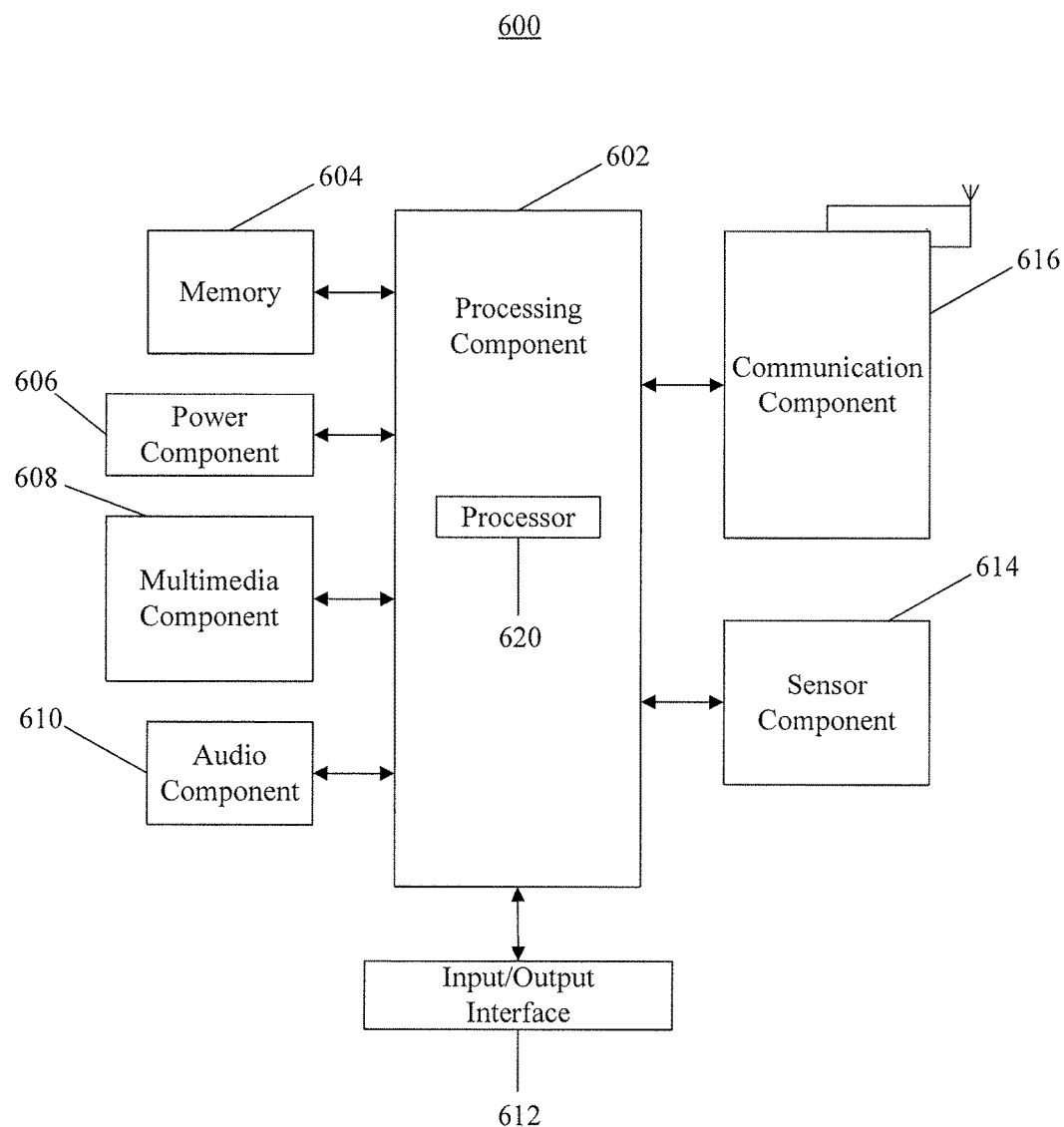
FIG. 6 is a block diagram of a terminal according to an exemplary embodiment.

FIG. 6 is a block diagram of a terminal 600 according to an exemplary embodiment of the disclosure. For example, the terminal 600 may be a mobile phone, a computer, a digital broadcast terminal, a message transceiver device, a game console, a tablet device, a medical device, fitness equipment, a personal digital assistant or the like.

Referring to FIG. 6, the terminal 600 may comprise one or more following components: a processing component 602, a memory 604, a power component 606, a multimedia component 608, an audio component 610, an input/output (I/O) interface 612, a sensor component 614 and a communication component 616.

The processing component 602 typically controls overall operations of the terminal 600, such as the operations associated with display, telephone calls, data communications, camera operations and recording operations. The processing component 602 may include one or more processors 620 to execute instructions to perform all or part of the steps in the above described methods. Moreover, the processing component 602 may include one or more modules which facilitate the interaction between the processing component 602 and other components. For example, the processing component 602 may comprise a multimedia module to facilitate the interaction between the multimedia component 608 and the processing component 602.

The memory 604 is configured to store various types of data to support the operation of the terminal 600. Examples of such data comprise instructions for any applications or methods operated on the terminal 600, various kinds of data, messages, pictures, video, etc. The memory 604 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

In this embodiment, the memory 604 stores instructions executable by the processor 620. The processor 620 is configured to execute the instructions to: calculate, based on application information received by the terminal 600, an information display characteristic of the application information, the information display characteristic representing a display feature of the application information; determine the application information as interfering information, if the information display characteristic meets an interference characteristic condition; and filter out the application information.

The power component 606 provides power to various components of the terminal 600. The power component 606 may comprise a power management system, one or more power sources, and any other components associated with the generation, management, and distribution of power in the terminal 600.

The multimedia component 608 comprises a screen providing an output interface between the terminal 600 and the user. In some embodiments, the screen may comprise a liquid crystal display (LCD) and a touch panel. If the screen comprises the touch panel, the screen may be implemented as a touch screen to receive input signals from the user. The touch panel comprises one or more touch sensors to sense touches, swipes and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and the rear camera may receive an external multimedia datum while the terminal 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone configured to receive an external audio signal when the terminal 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 comprises one or more sensors to provide status assessments of various aspects of the terminal 600. For instance, the sensor component 614 may detect an open/closed status of the terminal 600, relative positioning of components, e.g., the display and the keypad, of the terminal 600, a change in position of the terminal 600 or a component of the terminal 600, presence or absence of user's contact with the terminal 600, an orientation or an acceleration/deceleration of the terminal 600, and a change in temperature of the terminal 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor or a temperature sensor.

The communication component 616 is configured to facilitate communication, wired or wirelessly, between the terminal 600 and other devices. The terminal 600 can access a wireless network based on a communication standard, such as WiFi, 2G, 3G, or 4G, or a combination thereof. In one exemplary embodiment, the communication component 616 receives a broadcast signal or broadcast associated information from an external broadcast management system via a broadcast channel. In one exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In an exemplary embodiment, there is also provided a non-transitory computer-readable storage medium including instructions, such as included in the memory 604, executable by the processor 620 in the terminal 600, for performing the above-described methods. For example, the non-transitory computer-readable storage medium may be a ROM, a RAM, a CD-ROM, a magnetic tape, a floppy disc, an optical data storage device or the like.

One of ordinary skill in the art will understand that the above described modules can each be implemented by hardware, or software, or a combination of hardware and software. One of ordinary skill in the art will also understand that multiple ones of the above described modules may be combined as one module, and each of the above described modules may be further divided into a plurality of sub-modules.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. The specification and examples are intended to be exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. An information filtering method for use in a terminal, comprising:

calculating, based on application information received by the terminal, an information display characteristic of the application information, the information display characteristic representing a display feature of the application information;

determining the application information as interfering information, if the information display characteristic meets an interference characteristic condition; and filtering out the application information, wherein when the information display characteristic is display coordinates of the application information, the determining the application information as interfering information if the information display characteristic meets the interference characteristic condition comprises:

determining the application information as interfering information if the display coordinates fall within a preset interference coordinate range, and the method further comprises:

acquiring historically recorded data on coordinate ranges in which target information is acquired; and obtaining the preset interference coordinate range through statistical processing based on the data on the coordinate ranges, the data on the coordinate ranges comprising an average coordinate value of a preset number of positions clicked by a user in a process of continuously clicking a screen of the terminal.

2. The method according to claim 1, wherein when the information display characteristic is a digest of the application information, the determining the application information as interfering information if the information display characteristic meets the interference characteristic condition comprises:

comparing the digest of the application information with stored digests; and determining the application information as interfering information if a digest identical to the digest of the application information exists in the stored digests.

3. The method according to claim 2, further comprising:

storing an information file corresponding to a preset time period, the information file storing a digest of each piece of application information received in the preset time period; and determining if the information display characteristic meets the interference characteristic condition, by determining if the digest identical to the digest of the application information is stored in the information file.

4. The method according to claim 1, wherein the filtering out the application information comprises:
displaying a mark at a display position of the application information, the mark indicating that the application information is received; and
displaying the application information at the display position, if a display instruction from a user with respect to the mark is received.

5. The method according to claim 1, further comprising:
receiving the application information in an instant communication application.

6. A terminal, comprising:
a processor; and
a memory configured to store instructions executable by the processor,
wherein the processor is configured to:
calculate, based on application information received by the terminal, an information display characteristic of the application information, the information display characteristic representing a display feature of the application information;
determine the application information as interfering information, if the information display characteristic meets an interference characteristic condition; and
filter out the application information,
wherein when the information display characteristic is display coordinates of the application information, the determining the application information as interfering information if the information display characteristic meets the interference characteristic condition comprises:
determine the application information as interfering information if the display coordinates fall within a preset interference coordinate range, and
the processor is further configured to:
acquire historically recorded data on coordinate ranges in which target information is acquired; and
obtain the preset interference coordinate range through statistical processing based on the data on the coordinate ranges, the data on the coordinate ranges comprising an average coordinate value of a preset number of positions clicked by a user in a process of continuously clicking a screen of the terminal.

7. The terminal according to claim 6, wherein when the information display characteristic is a digest of the application information, the processor is further configured to:
compare the digest of the application information with stored digests; and
determine the application information as interfering information if a digest identical to the digest of the application information exists in the stored digests.

8. The terminal according to claim 7, wherein the processor is further configured to:
store an information file corresponding to a preset time period, the information file storing a digest of each piece of application information received in the preset time period; and
determine if the information display characteristic meets the interference characteristic condition, by determining if the digest identical to the digest of the application information is stored in the information file.

9. The terminal according to claim 6, wherein the processor is further configured to:
display a mark at a display position of the application information, the mark indicating that the application information is received; and
display the application information at the display position, if a display instruction from a user with respect to the mark is received.

10. The terminal according to claim 6, wherein the processor is further configured to:
receive the application information in an instant communication application.

11. A non-transitory computer-readable storage medium having stored therein instructions that, when executed by a processor of a terminal, cause the terminal to perform an information filtering method comprising:
calculating, based on application information received by the terminal, an information display characteristic of the application information, the information display characteristic representing a display feature of the application information;
determining the application information as interfering information, if the information display characteristic meets an interference characteristic condition; and
filtering out the application information,
wherein when the information display characteristic is display coordinates of the application information, the determining the application information as interfering information if the information display characteristic meets the interference characteristic condition comprises:
determining the application information as interfering information if the display coordinates fall within a preset interference coordinate range, and
the method further comprises:
acquiring historically recorded data on coordinate ranges in which target information is acquired; and
obtaining the preset interference coordinate range through statistical processing based on the data on the coordinate ranges, the data on the coordinate ranges comprising an average coordinate value of a preset number of positions clicked by a user in a process of continuously clicking a screen of the terminal.

12. The storage medium according to claim 11, wherein when the information display characteristic is a digest of the application information, the determining the application information as interfering information if the information display characteristic meets the interference characteristic condition comprises:
comparing the digest of the application information with stored digests; and
determining the application information as interfering information if a digest identical to the digest of the application information exists in the stored digests.

13. The storage medium according to claim 12, wherein the method further comprises:
storing an information file corresponding to a preset time period, the information file storing a digest of each piece of application information received in the preset time period; and
determining if the information display characteristic meets the interference characteristic condition, by determining if the digest identical to the digest of the application information is stored in the information file.

14. The storage medium according to claim 11, wherein the filtering out the application information comprises:
displaying a mark at a display position of the application information, the mark indicating that the application information is received; and displaying the application information at the display position, if a display instruction from a user with respect to the mark is received.

\* \* \* \* \*